Patented Sept. 2, 1952

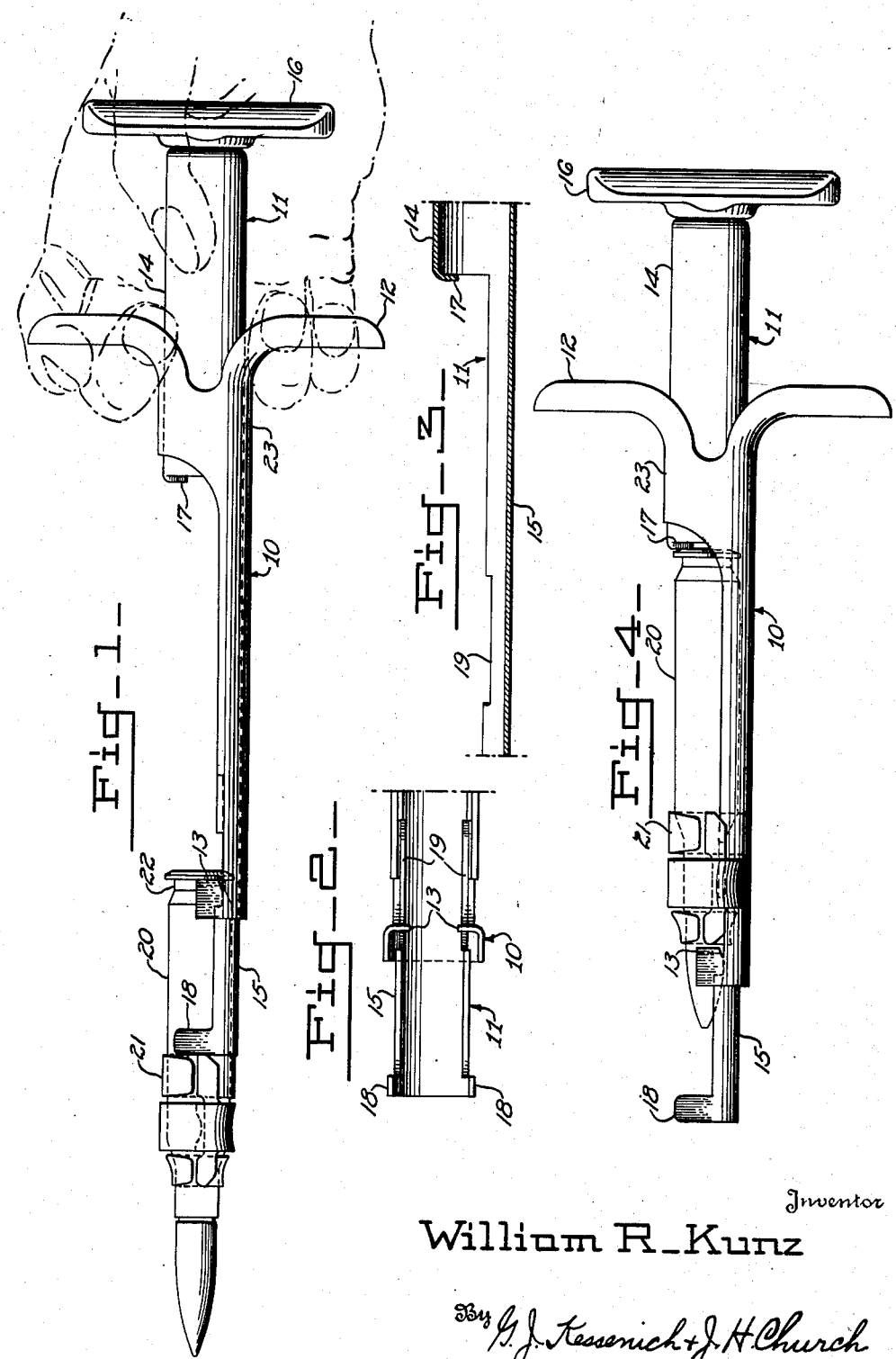

2,608,900

UNITED STATES PATENT OFFICE 2,608,900

CARTRIDGE BELT ASSEMBLY TOOL

William R. Kunz, Springfield, Mass., assignor to the United States of America as represented by the Secretary of War Application May 12, 1948, Serial No. 26,674
5 Claims. (Cl. 86—48)

(Granted under the act of March 3, 1883, as amended April 30, 1928; 370 O. G. 757)

The invention described herein may be manufactured and used by or for the Government for governmental purposes without the payment to me of any royalty thereon.

This invention relates to a tool for the assembly or disassembly of disintegrating metallic link type of cartridge belts.

In firing machine guns it is sometimes desirable to add to a belt of cartridges some other type of ammunition or to remove a portion of the loaded belt. In the past this has been performed by hand with uncertain results for the reason that in assembling one belt to another the cartridge linking the two belts was rarely ever properly inserted in the cartridge link. Obviously if a cartridge is not properly loaded in the belt, such round will not feed through the firearm thereby resulting in a feed jam.

Accordingly it is an object of this invention to provide a simple hand tool for assembling or disassembling a belt of cartridges formed of disintegrating metallic links.

Another object of this invention is to provide a cartridge belt assembly tool of simple construction for accurately seating a cartridge in a belt comprised of disintegrating metallic links.

The specific nature of the invention as well as other objects and advantages thereof will clearly appear from a description of a preferred embodiment as shown in the accompanying drawings in which:

Fig. 1 is a side elevational view of the device of this invention shown in the open or delinking position.

Fig. 2 is a fragmentary top view of Fig. 1 showing the forward end of the device and the various lugs utilized to engage either the cartridge or the cartridge link.

Fig. 3 is a fragmentary cross-sectional view of the cartridge actuator showing the depending lug thereon.

Fig. 4 is a view similar to Fig. 1 but showing the cartridge positioned for assembly to the cartridge link.

There is shown in Fig. 1 in assembled relation a cartridge belt assembly tool embodying this invention. Such tool comprises essentially two tubular telescoping members 10 and 11. Tube member 11, which may be termed a cartridge seating member or actuator, is slidably mounted within tubular member 10 which may be termed a housing.

Housing 10 is provided on one end with a cylindrical portion 23 terminating in a finger gripping portion 12. Such portion is formed by longitudinally slitting cylindrical portion 23 for a substantial distance and then bending each half of the tube produced by such slitting operation outwardly at substantially right angles to the axis of housing 10. Forwardly of cylindrical portion 23, housing 10 is cut away to a substantially semi-cylindrical shape. On the extreme forward end of housing 10, however, there is provided a pair of oppositely disposed inwardly projecting lugs 13 for a purpose to be later described. Such lugs are integrally formed with housing 10 and are preferably produced by cutting and bending a portion of the side walls inwardly as shown.

Cartridge actuator 11 comprises a tubular portion 14 and a forward end portion 15 of substantially semi-cylindrical shape. Tubular portion 14 of actuator 11 telscopes within the cylindrical portion 23 of housing 10 while the forward portion 15 of actuator 11 slides within the forward portion of housing 10. A handle 16 is secured, as by welding, to the tubular portion 14 of actuator 11 or can be integrally formed therewith. On the forward end of tubular portion 14 there is provided an integral lug 17 depending from the top of tubular portion 14 as shown in Fig. 1. A pair of integral opposed upstanding lugs 18 are provided on the forward end of actuator 11 for a purpose to be later described.

Somewhat to the rear of lugs 18 there is provided a pair of oppositely disposed notches 19 extending longitudinally of the portion 15 of actuator 11. Lugs 13 of housing 10 enter notches 19 and cooperate therewith to limit the longitudinal movement of actuator 11 with respect to housing 10 by an amount equal to the length of such notches.

To assemble a cartridge belt comprised of disintegrating links 21 to another similar belt, a cartridge 20 is inserted into the end links in the usual manner. Such cartridge and links are then placed inside of actuator 11 with the base thereof resting against lug 17. The inwardly bent lugs 13 provided on housing 10 bear against the forward edge of cartridge link 21 as shown in Fig. 4. Then by grasping finger portion 12 of housing 10 and forcing handle 16 of actuator 11 forwardly, lug 17 then pushes cartridge 20 forwardly into links 21 to the proper depth as governed by notches 19.

To break a cartridge belt of the type above-mentioned, lugs 13 of housing 10 are placed within an extractor groove 22 of cartridge 20 as shown in Fig. 1 and the upstanding lugs 18 of actuator 11 are placed against the back of the cartridge link 21 as shown in such figure. Retracting housing 10 by finger gripping portion 12 withdraws cartridge 20 from the belt of the ammunition thereby separating the cartridge belt.

From the foregoing description it is apparent to those skilled in the art that there is here provided a tool for rapidly, conveniently and easily assembling a cartridge belt of the disintegrating metallic link type to a corresponding belt or for breaking such belt into short lengths as may be desired. Such tool is of simple and rugged construction thereby insuring ease of operation and long life. Further, it is pointed out that such tool while having the desired characteristics of rigidity and strength, is also light and compact thereby permitting its inclusion in an armorer's kit without taking up much space or adding appreciably to the weight thereof.

I claim:

1. A cartridge belt assembly tool comprising a housing element, a cartridge seating element, each of said elements having a semi-cylindrical portion and a tubular portion, said seating element being telescopically mounted in said housing for slidable movement therein, said semi-cylindrical portion of said seating element forming an opening to receive a partially linked cartridge therein, a pair of oppositely disposed lugs on said housing arranged to engage said cartridge seating member for limiting the longitudinal movement thereof, said lugs being also engageable with the link in one position of the cartridge, said cartridge seating member being movable to seat a cartridge in the link, and a pair of upstanding arms on the end of said cartridge seating member adapted to engage the link in another position of the cartridge in said cartridge seating member, said lugs being then engageable with the extractor groove of the cartridge, said cartridge seating member then being movable to withdraw a cartridge from the belt.

2. A cartridge belt assembly tool comprising a substantially cylindrical unitary tubular housing having a pair of flared arms on one end thereof, a unitary cartridge seating member slidably mounted in said housing for telescopic connection therewith, said cartridge seating member being constructed and arranged to receive a partially linked cartridge, said cartridge seating member being provided with a handle portion juxtaposed to said flared arms, a pair of oppositely disposed lugs on said housing arranged to engage said cartridge seating member for limiting the longitudinal movement thereof, said lugs being also engageable with the link in one position of the cartridge, said cartridge seating member being then movable forwardly by bringing together said flared arms and said handle portion to seat a cartridge in the link, and a pair of upstanding arms on the end of said cartridge seating member adapted to engage the link in another position of the cartridge in said cartridge seating member, said lugs being then engageable with the extractor groove of the cartridge, said cartridge seating member being then movable forwardly by bringing together said flared arms and said handle portion to withdraw a cartridge from the belt.

3. A tool for assembly of disintegrating link cartridge belts comprising a housing element, a cartridge seating element, each of said elements having a semi-cylindrical portion and a tubular portion, said seating element being telescopically mounted in said housing for slidable movement therein, said semi-cylindrical portion of said seating element forming an opening to receive a partially linked cartridge therein, a pair of lugs on said housing arranged to engage the link in one position of the cartridge in said housing whereby said cartridge seating member is operable to seat the cartridge in the link, said lugs being provided with an inwardly facing portion arranged to engage the extractor groove of the cartridge in another position of the cartridge in said housing, and means on said cartridge seating member engageable with the link when said inwardly facing portions engage the extractor groove of the cartridge whereby said cartridge seating member is operable to withdraw a cartridge from the belt.

4. The combination defined in claim 3 plus means for limiting the longitudinal movement of said cartridge seating member for seating the cartridge in the link to a desired depth.

5. A tool for assembly of disintegrating linked cartridge belts comprising a housing having a semi-cylindrical front portion and a tubular rear portion terminating in a pair of flared arms oppositely disposed, a cartridge seating member having a semi-cylindrical front portion and a tubular rear portion terminating in a T-shaped handle, said seating element being telescopically mounted in said housing for slidable movement therein, said semi-cylindrical portion of said seating element forming an opening to receive a partially linked cartridge therein, a pair of lugs on said housing arranged to engage the link in one position of the cartridge in said housing whereby said cartridge seating member is operable by bringing together said arms and said handle to seat the cartridge in the link, said lugs being provided with an inwardly facing portion arranged to engage the extractor groove of the cartridge in another position of the cartridge in said housing, and means on said cartridge seating member engageable with the link when said inwardly facing portions engage the extractor groove of the cartridge whereby said cartridge seating member is operable by bringing together said arms and said handle to withdraw a cartridge from the belt.

WILLIAM R. KUNZ.

REFERENCES CITED

The following references are of record in the file of this patent:

UNITED STATES PATENTS

| Number | Name | Date |
| --- | --- | --- |
| 2,359,842 | Haberstump | Oct. 10, 1944 |